United States Patent [19]
Wexler

[11] Patent Number: 5,960,409
[45] Date of Patent: Sep. 28, 1999

[54] THIRD-PARTY ON-LINE ACCOUNTING SYSTEM AND METHOD THEREFOR

[76] Inventor: Daniel D. Wexler, 481 Stratford Rd., Brooklyn, N.Y. 11218

[21] Appl. No.: 08/729,188

[22] Filed: Oct. 11, 1996

[51] Int. Cl.[6] ............................ G06F 13/14; G06F 13/42; H04L 12/46; H04L 29/02
[52] U.S. Cl. ........................... 705/14; 709/224; 709/245; 709/218; 707/501
[58] Field of Search .................................. 705/14, 26, 27, 705/30; 395/200.54, 200.57, 200.48, 200.75; 707/501, 513, 104; 380/23, 24, 25; 379/118, 127, 142; 709/218, 224, 227, 245

[56] References Cited

U.S. PATENT DOCUMENTS

| | | | |
|---|---|---|---|
| 5,220,655 | 6/1993 | Tsutsui ................................ | 395/200.54 |
| 5,359,508 | 10/1994 | Rossides ..................................... | 705/30 |
| 5,537,314 | 7/1996 | Kanter ........................................ | 705/14 |
| 5,557,721 | 9/1996 | Fite et al. .................................... | 705/14 |
| 5,572,643 | 11/1996 | Judson ................................ | 395/200.48 |
| 5,712,979 | 1/1998 | Graber et al. ........................ | 395/200.54 |
| 5,717,860 | 2/1998 | Graber et al. ........................ | 395/200.57 |
| 5,740,549 | 4/1998 | Reilly et al. ................................ | 705/14 |
| 5,751,956 | 5/1998 | Kirsch ................................ | 395/200.33 |
| 5,812,769 | 9/1998 | Graber et al. .............................. | 705/14 |

OTHER PUBLICATIONS

Streams Press Release, "Streams Readies Release of Breakthrough Internet Media Planning and Assessment", http://streams.com/press release.html, Aug. 31, 1995, pp. 1–2.

"Research Firms Strive for Web Tracking That Counts", Interactive Marketing News, vol. 2, No. 13, Jun. 23, 1995.

W3 Organization, "HTTP Request Fields", http://www.w3.org/pub/WWW/Protocols/HTTP/HTRQ Headers.html, May 3, 1994, pp. 1–5.

*Primary Examiner*—Eric W. Stamber
*Attorney, Agent, or Firm*—DeMont & Breyer, L.L.C.; Wayne S. Breyer; Jason Paul DeMont

[57] ABSTRACT

A system and method for providing on-line third party accounting and statistical information is disclosed. A third party accounting service receives a download request signal ultimately intended for an advertiser Web site. The download request signal is generated when a user clicks on a banner displayed on a Web page of a frequently-visited Web site. The banner is published by the frequently-visited Web site for the benefit of the advertiser. The third party receives the download request since, rather than pointing to the advertiser Web site, the banner is configured to point to the third party Web site. The third party Web site maintains a count of all received download request signals generated by clicking on the banner. Since an advertiser banner may be displayed at more than one frequently-visited Web site, the third party Web site further maintains a log containing the address of the frequently-visited Web site that displayed the banner that generated the click, as well as other information provided by tile user Web browser. The third party sends a redirect signal to the user Web browser causing it to send a download request to the advertiser Web site. The advertiser Web site then downloads the information originally sought by the user to his Web browser. The third party accumulates and tabulates statistical information including the number of clicks on the advertiser banner, and data indicative of the effectiveness of the banner-publisher frequently-visited Web site as an advertising medium. Such information is provided to the advertiser and/or the banner publisher.

11 Claims, 2 Drawing Sheets

THIRD-PARTY ON-LINE ACCOUNTING SYSTEM AND METHOD THEREFOR

FIELD OF THE INVENTION

The present invention relates to Internet services.

BACKGROUND OF THE INVENTION

Until as recently as five years ago, the Internet was used primarily by the scientific and technical community and was relatively unknown outside of such circles. And now, five years hence, knowledge of the Internet, and its use, are ubiquitous.

Businesses have recognized the benefits of establishing a presence on the Internet, and, more particularly, on the World Wide Web (Web). One benefit is that it is a convenient way for both the buyer and the seller to do business; products and services can be ordered on-line. Another benefit to a business is that for the money spent, its advertising can reach a lot of prospective customers.

One form of Internet advertising is to establish a Web site operable to download at least one "Web page" to a user "visiting" that Web site. A Web page contains a single file of hypertext information, which may be text, graphics and even sound. The main Web page of a given Web site is referred to as a "Home page." The Home page is typically the first page a user will see when visiting a site. The Home page usually contains hypertext "links," to other subsidiary Web pages providing additional information about the business.

A Web site is ineffective as an advertising tool unless someone visits it, And, the only ones visiting the site are those that have sought it out. To increase the likelihood of such visitations, businesses may list their Web site on one or more Web directories. A user interested in particular products or services can use a search engine to search the Web directory and identify businesses providing such products or services and their Web address. The user can then "browse" the Web sites of the businesses offering the products/services of interest.

A directory listing increases the likelihood of a user finding the Web site of a particular business. Still, an advertiser listing will be found only if the user is looking for the goods or services provided by the advertiser. As such, many frequently-visited Web sites offer businesses a more aggressive alternative to a simple directory listing. In particular, a business can choose to have a "banner" displayed or "published" by such a frequently-visited site.

The banner describes an area of a Web page that can be used to display logos, etc., that will hopefully entice the reader to obtain further information pertaining to the banner. If so enticed, the reader can "click" on the banner, assuming the banner is a link, and follow the link to, for example, the Web site of the business "behind" the banner. The banner provides substantially more of an advertising presence to the advertiser than a directory listing, since, at least for a contracted period of time, the banner is conspicuously displayed on the Web page. Thus, regardless of a user purpose for visiting such a site, he may see the advertiser banner displayed.

While there is typically no cost for having one Web site listed in a directory, advertising with a banner is typically provided for a fee. The cost of advertising at such a site may be based, for example, on the number of times the site displays the banner or on the number of times a user clicks on the banner linked to the advertiser Web site. And, of course, the cost is based on the popularity of the frequently-visited site. While anyone with a Web site can display a banner, advertisers will want to advertise at frequently-visited sites, such as Web directories and large service providers that offer their own information and online resources as well as Internet access such as America Online, Compuserve, Prodigy and the like.

Regardless of the fee basis, both the advertiser and the administrator of the banner-publishing site will typically have an interest in knowing certain statistics pertaining to advertising effectiveness. For example, if the fee for the advertising is based on the number of clicks on the banner, then both parties will want this statistic. The advertiser can obtain this information by interrogating an access log maintained by the advertiser Web site. This information, however, is not directly available to the banner-publishing site. While it can be obtained from the advertiser, the publishing-site administrator would presumably prefer receiving the relevant statistics from an unbiased source.

Further, since advertisers will often advertise at more than one location, both the advertisers and the publishers will typically have an interest in the statistics pertaining to the effectiveness of an individual publishing site at generating leads for the advertiser. In other words, they will be interested in knowing the percentage of the total number of "clicks" on the banner generated by each publishing site. Currently, such information is not readily available. To obtain it requires that the appropriate expertise is available, and that the server at the advertiser Web site is appropriately configured.

In view of the value of such statistics, and the relative inconvenience in obtaining such information, a need presently exists for an unbiased, readily available source of statistical/accounting information for Internet advertisers and advertising publishers.

SUMMARY OF THE INVENTION

A system and method for providing on-line third party accounting and statistical information is disclosed. According to the invention, a banner, displayed for the purpose of enticing a first party (user) to visit a fourth party's (advertiser) Web site, is served to the user's Web browser by a second party (banner publisher). The banner is operable to download the address of a third-party (accounting and statistical service) to the user's Web browser and establish a link between the user and the third party service. The third party service receives a download request signal from the user's Web browser when the link is established, and maintains a count of received request signals and a log entry containing the second party's Web site address and other information provided by the user's Web browser. The third party service redirects the Web browser's download request signal to the advertiser's Web site, which serves a Web page to the user's Web browser. The method is transparent to the user; i.e., as far as the user is aware, the banner takes him directly to the advertiser's Web site.

The third party accumulates and tabulates statistical information including the number of clicks on the advertiser's banner, and further provides data indicative of the effectiveness of the banner publisher's Web page as an advertising medium.

BRIEF DESCRIPTION OF THE DRAWING

Further features of the invention will become more apparent from the following detailed description of specific embodiments thereof when read in conjunction with the accompanying drawings, in which.

DETAILED DESCRIPTION OF THE INVENTION

The present invention can be implemented over a network such as the Internet. It is understood that such a network is comprised of many computers linked over telecommunication lines and communicating using various standard protocols. Servers, which are programs that provide Internet resources (e.g, a Web page), and clients, which are programs that access those resources on a user's behalf (e.g., a Web browser), are resident on such computers. Details concerning such computers and software, and the process of establishing communication links are known to those skilled in the art and will not be described herein except as appropriate for an understanding of the present invention.

Moreover, for clarity of explanation, this specification contains terminology and conventions familiar to those skilled in the art. Such terminology is often more metaphorical than literal in nature. For example, while those skilled in the art may refer to "visiting" a particular Web site, it should be appreciated that a user does not actually travel to the web site. Rather, a source file that is operable, in conjunction with the user's Web browser, to generate a Web page on a user's computer monitor is downloaded to the user's computer. Those skilled in the art are familiar with such metaphorical terminology and have an understanding of its literal implications and implementations.

Figure 1:
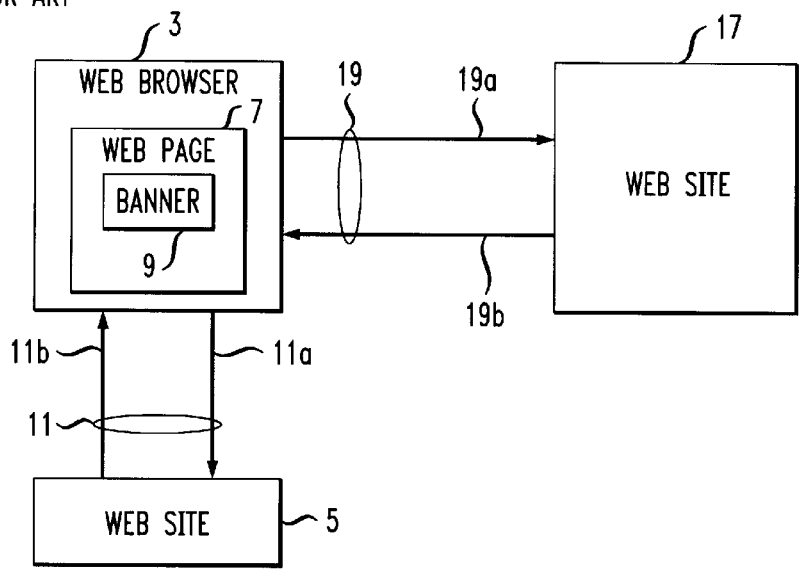
FIG. 1 shows a conventional system for advertising with a banner.

FIG. 1 shows a prior art on-line system for advertising with a banner 9. As shown in FIG. 1, a user's Web browser 3 establishes a link or connection 11 with a Web site 5 of an entity displaying the banner ("banner publisher"). The banner publisher is anyone who presents advertising on behalf of an advertiser. The banner publisher will typically be a Web directory or a large service provider such as America Online, Compuserve, Prodigy and the like that offers their own information and online resources, as well as Internet access.

Once the user is on-line, i.e., connected to the Internet through an Internet Service Provider (ISP), the link 11 to the Web site 5 is established by "entering" the address, i.e., the uniform resource locator (URL), of the Web site 5 into the Web browser 3. Once the link 11 is established, the Web browser 3 sends a download request signal 11a to the Web site 5. In response, the Web site 5 downloads information, indicated by the reference numeral 11b, to the user's Web browser 3. The downloaded information includes a Web page 7 having a banner 9. The banner 9 is an area of the Web page 7 that can be used to display logos, etc., that will hopefully entice a user reading the banner to obtain further information pertaining to the banner.

As will be appreciated by those skilled in the art, a Web page is a hypertext file or source located on a specific computer. The hypertext source includes text as well as instructions for the user's browser as to how to display such text. The instructions are coded using a set of specifications referred to as Hypertext Markup Language (HTML).

The hypertext source contains one or more hypertext "links" that "point," i.e., provide the address, to another hypertext file. If a user wishes to "follow" the link, the user can "click" on it, such as by depressing a mouse button. The user's browser then connects to the, appropriate Web site (computer), as dictated by the URL associated with the link, and sends a download request signal for a copy of the hypertext source associated with the URL. When the copy arrives, the browser displays the file in a format dictated by the HTML, generating a Web page on the user's browser. Included in the downloaded copy are the specifications of the banner 9 and associated links.

If enticed by the banner 9, the user can "click" on it, assuming the banner has a link associated with it. In the prior art, a banner typically points to the Web site 17 of the advertiser. A download request signal 19a is sent from the user's Web browser 3 to the advertiser's Web site 17. The Web site 17 downloads information, indicated by the reference numeral 19b, to the user's Web browser 3. The downloaded information is a copy of a hypertext source file operable to generate a Web page of the advertiser.

Figure 2:
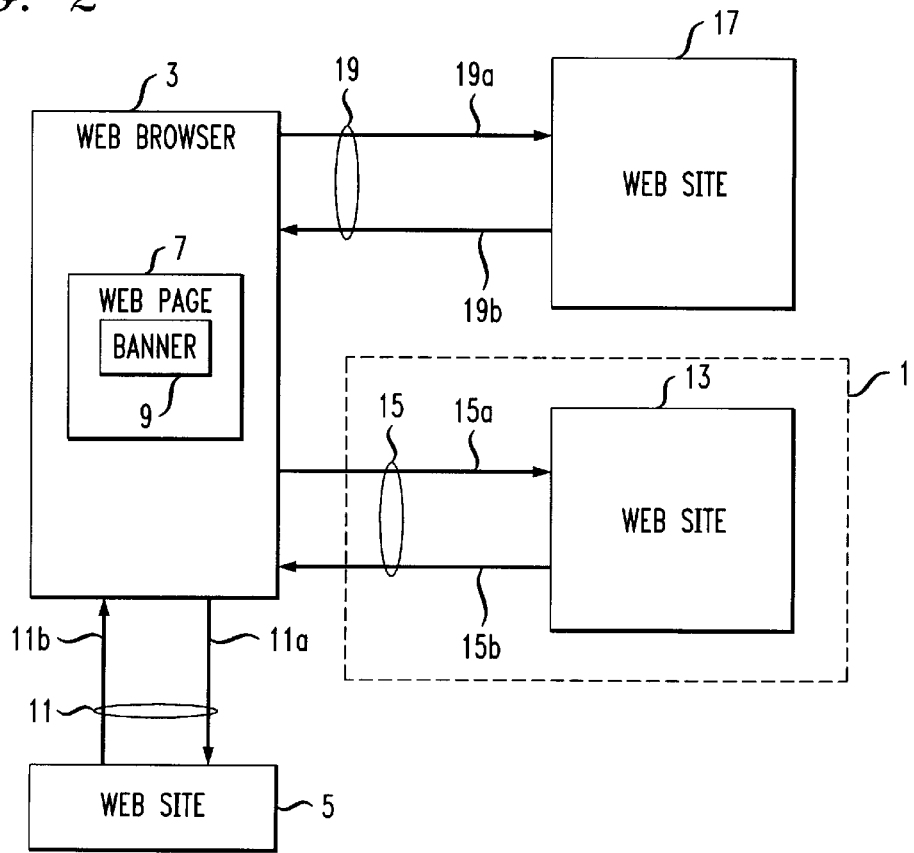
FIG. 2 is an exemplary embodiment of an on-line third party accounting and statistical system according to the present invention.

FIG. 2 shows an exemplary embodiment of an on-line third party accounting and statistical system 1 according to the present invention. As shown in FIG. 2, the system 1 includes the elements of FIG. 1, as well as the Web site 13 of a third party accounting and statistical service, and the link created between the user's Web browser and the third party Web site 13. With the addition of the Web site 13 of the third party service, and appropriate programming, the information flow between the user and the various Web sites changes, as described below.

As described above for conventional systems, the link 11 to the Web site 5 is established by entering the URL of the Web site 5 into the Web browser 3. Once the link 11 is established, the Web browser 3 sends a download request signal 11a to the Web site 5. In response, the Web site 5 downloads information, indicated by the reference numeral 11b, to the user's Web browser 3. The downloaded information includes a copy of the requested hypertext source file operable to generate a Web page 7 having a banner 9.

As before, if the user is interested in more information about the banner 9, he may click on it. According to the present invention, the banner 9 points to the third party Web site 13 rather than the advertiser's Web site 17 as in conventional arrangements. As such, in a system according to the present invention, clicking on the banner 9 establishes a link between the user's Web browser 3 and the third party Web site 13. This is facilitated by the operation described in operation block 101 of the flow diagram of FIG. 3, which is an exemplary method according to the present invention. According to operation block 101, the hypertext file that generates the Web page 7 and the banner 9 is edited or originally coded so that the banner 9 is operable, in conjunction with the user's Web browser 3, to form a hypertext link to the third party Web site 13 when clicked upon. The aforementioned coding includes the URL pointing to the third party site 13.

Figure 3:
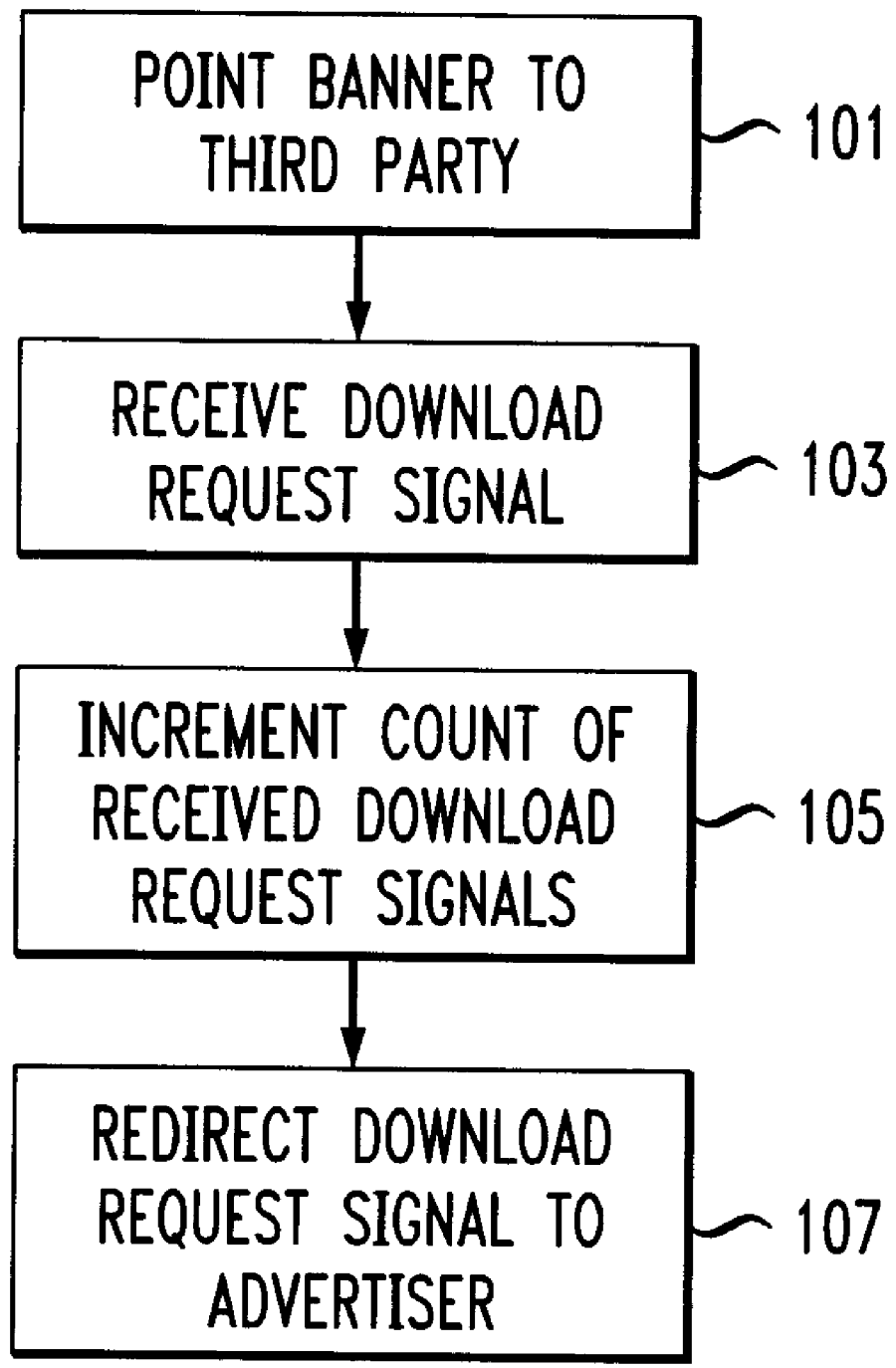
FIG. 3 is a flow diagram of an illustrative method for implementing the system of FIG. 2.

If a user clicks on the banner 9 forming a link to the third party, then, as indicated in operation block 103 of FIG. 3, the third party accounting and statistical service 13 receives a download request signal 15a from the user's Web browser 3. The third party service 13 accepts the download request signal 15a and increments a counter that keeps track of the number of received request signals, as indicated in operation block 105. Additionally, the third party service 13 logs a variety of information available from the user's Web browser 3. Such information can include the origin of the user, the address of the banner publisher, and so forth. In this manner, the third party service 13 accumulates statistical information useful to the banner publisher and the advertiser.

The download request received by the third party service 13 is ultimately intended to obtain information from the advertiser. As such, the third party service 13 redirects the received download request signal to the advertiser's Web site 17, as indicated in operation block 107. Specifically, the redirect request 15*b* is sent to the user's Web browser 3 from the third party Web site 13, and, from the browser, a download request 19*a* is sent to the advertiser's Web site 17. Once the download request signal is received by the advertiser, the advertiser's Web page is downloaded to the user's Web browser 3 as indicated by reference numeral 11*b*. The method is transparent from the user's point of view; he is not aware of the "detour" to the third party service 13.

In one embodiment, operation blocks 105 and 107 can be accomplished as follows. A Hypertext Transfer Protocol (HTTP) server program at the third party's site 13 is configured to issue a "302" redirect response when a specific URL is requested. Such configuration involves editing a configuration file for the HTTP server program. When the specific URL is requested, the request itself and Web browser 3 information is recorded, and the redirect to the intended URL, i.e., the advertiser's Web site, is issued. In this manner, the user is transparently redirected to the advertiser's Web site 17.

It will be appreciated that an advertiser may wish to advertise at more than one location, i.e., more than one banner-publishing site. If so, the advertiser will presumably want to know, among other statistics, the effectiveness of each of the publishing sites, i.e., which site generates the most visits to the advertiser's Web site 17. Likewise, a banner-publishing site may wish to display the advertising, i.e., banner, of more than one advertiser. In a further embodiment, the present invention can tally clicks and generate statistics for multiple banner-publishing sites and multiple advertisers. This is accomplished by using multiple URLS, each pointing to different entry points at the third party Web site 13. The third party Web site, more properly its server, accepts the incoming URLS, accumulates statistics, and redirects each user's Web browser 3 to the intended (advertiser's) Web site in the manner previously described. Thus, clicks originating from different publishing sites, as well as those intended for different advertisers, are each directed to different entry points at the third party Web site 13. Assigning multiple URLs for this purpose is illustrated by the example below.

For the present example, there are two banner publishers, "Pub A" and "Pub B" and three advertisers "Ban 1," "Ban 2" and "Ban 3." Advertisers Ban 1 and Ban 2 have their banners displayed at both publishers' Web sites. Advertiser Ban 3 displays its banner only with Pub A. Exemplary URLs for the five banners are as follows.

| Banner Publisher | Advertiser | URL |
| --- | --- | --- |
| Pub A | Ban 1 | http://www.genesis.com/puba/ban1 |
| Pub A | Ban 2 | http://www.genesis.com/puba/ban2 |
| Pub A | Ban 3 | http://www.genesis.com/puba/ban3 |
| Pub B | Ban 1 | http://www.genesis.com/pubb/ban1 |
| Pub B | Ban 2 | http://www.genesis.com/pubb/ban2 |

Thus, while advertiser Ban 1's banner at publisher A points to entry point "puba/ban1" at the third party Web site 13, Ban 1's banner at publisher B points to entry point "pubb/ban1." In this manner, the present invention can handle multiple banner publishers and multiple advertisers.

As appropriate, the third party accounting and statistical service 13 can provide a report to the advertiser and/or the banner publisher. The report may include statistic such as, for example, the number of clicks on the banner 5, the percentage of clicks that result from the banner 5 being displayed on a particular banner publisher's Web page if the total number of impressions is known, the number of clicks on the banner per day, the date and time of each click, the origin of the user and so forth. Additionally, the report may include correlations developed from such statistics and illustrative charts and graphs. Typically, such a report would be provided on a regular basis.

While the present invention finds particular utility for use in conjunction with the Internet, and, more specifically, the World Wide Web (WWW), it can be applicable to other suitably-configured networks, as well. Thus, in a more generally applicable embodiment, the present invention provides a system and a method for third party accounting on, a network consisting of a plurality of nodes, wherein a user at a first node views a first quantity of information provided by a second node (publisher) for the benefit of a fourth node (advertiser).

Although specific embodiments of this invention have been shown and described herein, it is to be understood that these embodiments are merely illustrative of the many possible specific arrangements and methods that can be devised in application of the principles of the invention. Numerous and varied other arrangements and methods can be devised in accordance with these principles by those of ordinary skill in the art without departing from the scope and spirit of the invention.

I claim:

1. A method for accounting, wherein a first publisher having a first Web site and a second publisher having a second Web site each publish advertising for an advertiser having a third Web site, the method comprising:

receiving, at a fourth Web site, a first uniform resource locator from a first user's Web browser, wherein the first uniform resource locator is obtained by the first user's Web browser from the first Web site and wherein the first uniform resource locator is associated with advertising for the advertiser;

logging, at the fourth Web site, the receipt of the first uniform resource locator, in response to the receipt of the first uniform resource locator;

redirecting, at the fourth Web site, the first user's Web browser to the third Web site in response to the receipt of the first uniform resource locator;

receiving, at the fourth Web site, a second uniform resource locator from a second user's Web browser, wherein the second uniform resource locator is obtained by the second user's Web browser from the second Web site and wherein the second uniform resource locator is associated with advertising for the advertiser;

logging, at the fourth Web site, the receipt of the second uniform resource locator, in response to receiving the second uniform resource locator; and redirecting, at the fourth Web site, the second user's Web browser to the third Web site in response to the receipt of the second uniform resource locator.

2. The method of claim 1 wherein the advertising published by the first publisher is a first banner that is associated with the first uniform resource locator and the advertising published by the second publisher is a second banner that is associated with the second uniform resource locator.

3. The method of claim 1 further comprising logging at least one of an indicium of the identity of the first user and an indicium of the identity of the first publisher.

4. The method of claim 1, further comprising preparing a report for one or both of the advertiser and the first publisher, the report comprising each receipt of the first uniform resource locator by the fourth Web site.

5. The method of claim 1 further comprising configuring a Hypertext Transfer Protocol server program at the fourth Web site to issue a 302 redirect response when the first uniform resource locator is received.

6. The method of claim 5 further comprising editing a configuration file for the Hypertext Transfer Protocol server program.

7. A method for third party accounting on a network that comprises a plurality of nodes, wherein a first node and a second node each publish advertising for a third node, the method comprising:

receiving, at a fourth node, a first download request signal from a fifth node, which first download request signal is received by the fifth node from the first node;

logging, at the fourth node, the receipt of the first download request signal;

transmitting from the fourth node a second download request signal to the fifth node, which second download request signal directs the fifth node towards the third node;

receiving, at the fourth node, a third download request signal from a sixth node, which third download request signal is received by the sixth node from the second node;

logging, at the fourth node, the receipt of the third download request signal; and transmitting from the fourth node a fourth download request signal to the sixth node, which fourth download request signal directs the sixth node to the third node.

8. The method of claim 7 wherein the advertising published by the first node for the third node is a first banner that is associated with the first download request signal and the advertising published by the second node for the third node is a second banner that is associated with the second download request signal.

9. A method comprising:

receiving a first uniform resource locator from a first browser, wherein the first uniform resource locator is obtained by the first browser from a first Web site that publishes advertising for an advertiser;

logging, in response to the receipt of the first uniform resource locator, the receipt of the first uniform resource locator;

transmitting, in response to the receipt of the first uniform resource locator, a second uniform resource locator to the first browser, wherein the second uniform resource locator is associated with a second Web site that is associated with the advertiser;

receiving a third uniform resource locator from a second browser, wherein the third uniform resource locator is obtained by the second browser from a third Web site that publishes advertising for the advertiser;

logging, in response to the receipt of the third uniform resource locator, the receipt of third uniform resource locator; and transmitting a fourth uniform resource locator to the second browser, wherein the fourth uniform resource locator is associated with the second Web site.

10. The method of claim 9 wherein the first uniform resource locator is uniquely associated with the first Web site and the second Web site, and wherein the third uniform resource locator is uniquely associated with the second Web site and the third Web site.

11. The method of claim 9 wherein the first uniform resource locator is associated with a first banner that is published by the first Web site and that is advertising for the advertiser and wherein the third uniform resource locator is associated with a second banner that is published by the third Web site and that is also advertising for the advertiser.

* * * * *